June 10, 1930.  H. N. COX  1,762,144
LENS SYSTEM FOR COLOR PHOTOGRAPHY
Filed June 11, 1927
FIG. I.
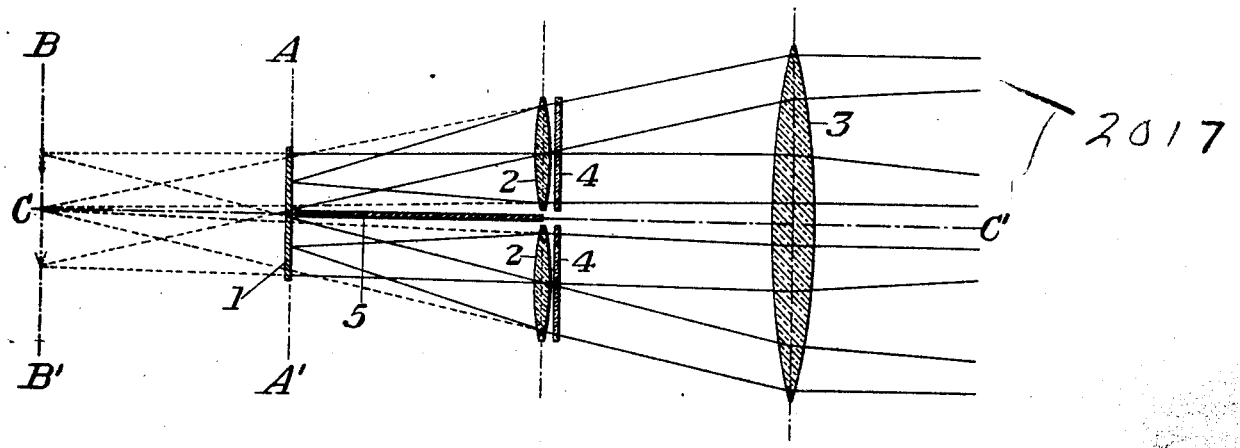
FIG. II.
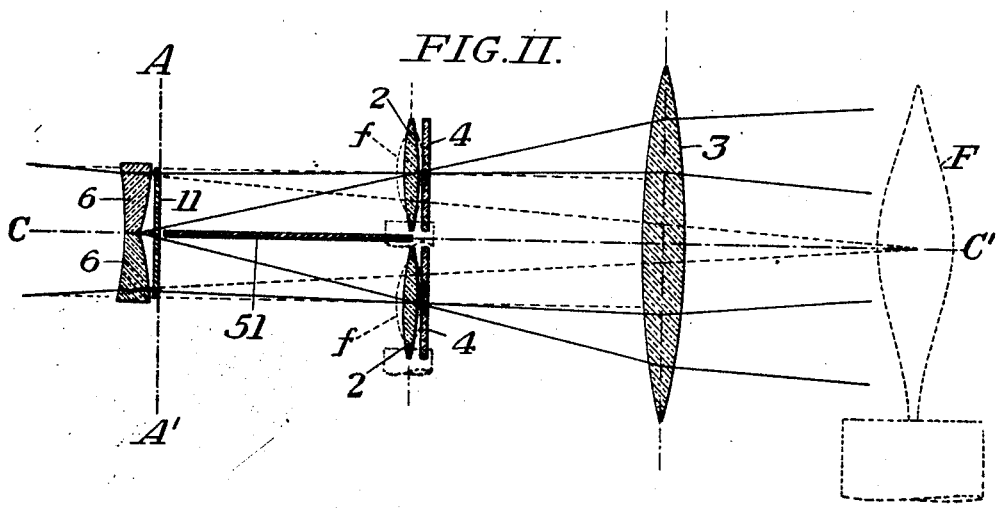
INVENTOR
Harold N. Cox
by Christy and Christy
his attorneys Patented June 10, 1930

1,762,144

UNITED STATES PATENT OFFICE

HAROLD N. COX, OF GLEN RIDGE, NEW JERSEY, ASSIGNOR TO COX MULTI-COLOR PHOTO COMPANY, OF PITTSBURGH, PENNSYLVANIA, A CORPORATION OF DELAWARE

LENS SYSTEM FOR COLOR PHOTOGRAPHY

Application filed June 11, 1927. Serial No. 198,200.

My invention relates to improvements in lens systems used in color photography; the lens system of my invention is applicable both in the camera used for taking the photograph and in the projector used for throwing the photograph upon a screen. In the latter case certain ancillary and additional lenses are preferably brought into combination with and into coordination with the lens system in which my invention in its broader aspect resides. It is applicable to apparatus for the taking and for the projecting either of still pictures or of motion pictures. The object in view is increased illumination. This I find may be, and preferably will be, achieved within such limits of space that the lens system of my invention may be applied to camera or to projector interchangeably with the lens used for ordinary black-and-white photography, thus avoiding the necessity of duplicating the equipment throughout in providing apparatus for color photography.

My invention is illustrated in the accompanying drawings. Fig. I is a view in axial section, showing diagrammatically a camera equipped with the lens system of my invention; Fig. II is a similar view, showing a projector.

Referring to Fig. I, the sensitive film within the camera is indicated at 1, situated in the plane A—A'. The lens system in which and in the correlation of which with the sensitive film my invention primarily resides, includes a plurality of identical rear objectives 2, and a front objective 3, with which the rear objectives in common are coordinated. With each rear objective 2 a color screen or filter 4 is associated, and it will be understood that the several color filters within a single lens system are of different colors. The number of rear objectives 2 in any single lens system may be two, three, or more. It is requisite only that they be spaced at a uniform radial distance from the main axis C—C' of the system. Partitions 5 within the camera segregate portions of the sensitive film 1 and isolate for each rear objective 2 its appropriate portion of the film. The light which passes through each rear objective reaches no other part of the film than the part so isolated with it. The camera then, when provided with the lens system of my invention and with the partitions 5, becomes in effect a plurality of cameras, designed simultaneously to record, each upon its proper portion of the film 1, the same picture, but in light rays of different color, as determined by the color filters 4.

In the drawing the parts 2 and 3 of the system are indicated, as though they were simple lenses; it will be understood that ordinarily each lens will be a compound structure of astigmatic character. The showing is accordingly in this respect also diagrammatic.

The first feature of my invention to which I direct attention is that the lens system is so spaced from the film that the distance from the film to the rear objectives 2 is less than the focal length of the rear objectives. Under the term film I mean to include both a sensitive film in the camera and a film in the projector which carries the printed photograph.

The front objective 3 is necessarily so placed that the plane B—B', the plane in which it would project an image, is so related to the plane A—A', and the lens parts 2, 2 are so related to both, that the image projected by lens part 3 (in the plane B—B') becomes the virtual object of lens parts 2, 2, with the consequence that lens parts 2, 2, cooperating with lens part 3, project their several images in the plane A—A', the plane of the film. This equation of the positions of lens parts and of film may be stated as follows. The distance at which the lens part 2 stands remote from the plane of the film equals the product of the focal length of the lens part 2 multiplied by the diameter of the circle in which the centers of the images on the film lie, divided again by the diameter of the circle in which the optical centers of the lens parts 2 lie. The width of the image of the lens part 3 in the plane B—B', equals the product of the width of the image on the film in the plane A—A', multiplied by the diameter of the circle in which the optical centers of the lens parts 2 lie, divided again by the remainder in the subtraction of the distance between the lens parts 2 and the film in the plane A—A' from the diameter of the circle in which the centers of the images in the plane A—A' lie.

The effective angle of view depends upon the relation between the focal length of the front objective 3 and the width of the image in the plane B—B'. Hence, if the focal length, spacing, and positions of the lens parts 2 are such as to project, as from a virtual object in the plane B—B', their several images in the plane A—A', and if the image projected by the lens part 3 in the plane B—B' be equal in size to the image projected in the same camera when used with a single lens for black-and-white photography, the lens used for ordinary black-and-white work, or a lens of equal focal length, may be used as the lens part 3 of the lens system of my invention, and in such alternate use the effective angle of view will continue unchanged. Other effective angles of view may, of course, be obtained by using a front objective (3) of different focal length, or by making adjustment of the other members of the lens system and of the distance from film to lens. The limitation, however, continues, that the focal length of the front objective (3) must be sufficiently greater than the distance between planes B—B' and the lens parts 2, to admit of focusing on a distant object.

In so bringing the lens parts 2 nearer to the plane A—A' of the film, the necessary distance at which the lens parts 2 stand remote from the axis of the system is increased. In consequence, the lens parts 2 may be made larger, and illumination increased in value. This may be achieved while still employing a camera of standard size, and a lens system of dimensions such that it may be applied interchangeably with the single lens used for ordinary black-and-white work.

Repetition is not necessary to explain the manifest fact, that the invention now described as applicable to the lens of a camera, may be applied equally to the lens of a projector, for throwing a picture on a screen.

In a projector a source of light is required and associated with the usual source of light a condenser is employed. A further feature of my invention is found in condenser parts which may be employed, cooperating with the lens system described, when that lens system is used in a projector. This further feature of invention is illustrated in Fig. II.

Here, as in the case already described, the lens system includes the plural lens parts 2, the single lens part 3, and the color filters 4. In place of a sensitive film it is a positive print 11 which in this case is situated in the plane A—A'. Partitions 51 divide the space within the projector. The direction of light travel instead of being from an external object to the film in plane A—A', is from a source of light, through the print in plane A—A' and thence through the lens system outward to a screen. The source of light and the usual condenser associated with it are not shown in Fig. II; it suffices to note that a convergent pencil of light is projected through the print.

An auxiliary condenser unit made up of components 6, 6, corresponding in number and in position around the axis C—C' to the lens parts 2 is arranged immediately to rearward of plane A—A' and behind print 11. Each of these auxiliary condenser components 6 consist, in effect, of a cut portion of a plano-concave lens and a cut portion of a plano-convex lens, made either of separate pieces of glass, or of one piece, as in this case each is diagrammatically shown to be. The positive (convex) part of each component 6 has its principal axis coincident with the principal axis of the lens part 2 with which it is correlated, and its focal length is equal to its distance from the lens part 2. The negative part of the components 6 is a common negative component, whose principal axis is coincident with the principal axis of the lens part 3. To get the best results the focal length of the negative part under consideration should be equal to the distance from the plane of the film to where the image of the light source would be, if the auxiliary condenser were not present. The focal lengths of these parts of the auxiliary condenser unit are indicated by the dotted outlines $f$ and $F$ of images of a candle flame.

I claim as my invention:

1. In color photography a lens system including a plurality of lenses equidistantly arranged about an axis combined with a single lens arranged in the axis, said lens system being associated with a film extending in a plane perpendicular to the said axis, the interval at which the lens system is spaced from the film being less than the focal length of the lenses first named.

2. In color photography a film extending in a plane, a plurality of optically identical objectives equidistantly arranged about an axis pependicular to the plane of the film and at uniform distance from the plane of the film and a distance less than the focal length of the said objectives, and another objective coordinated with all of the plurality of objectives first named and arranged in the said axis and on the side of the objectives first named opposite the film.

3. In color photography a projector including a lens system and a condenser system, the lens system including a plurality of lenses equidistantly arranged about an axis, and the condenser system including components corresponding in number and in position correlated to the plurality of lenses named above, each component having a convex part, whose principal axis is coincident with the principal axis of the lens with which it is correlated, and the components having a concave part common to all whose principal axis is coincident with the axis first mentioned.

In testimony whereof I have hereunto set my hand.

HAROLD N. COX.